United States Patent [19]

Doering et al.

[11] Patent Number: 4,847,833

[45] Date of Patent: Jul. 11, 1989

[54] SYSTEM FOR THE SIMULTANEOUS OPERATION OF A PLURALITY OF TERMINAL EQUIPMENT AT A NETWORK TERMINATING UNIT OF A BROADBAND NETWORK

[75] Inventors: Karlheinz Doering, Darmstadt; Karl J. Grimm, Muenster; Manfred Bertelsmeier, Darmstadt; all of Fed. Rep. of Germany

[73] Assignee: Siemens Aktiengesellschaft, Berlin and Munich, Fed. Rep. of Germany

[21] Appl. No.: 105,296

[22] PCT Filed: Dec. 16, 1986

[86] PCT No.: PCT/DE86/00515

§ 371 Date: Aug. 10, 1987

§ 102(e) Date: Aug. 10, 1987

[87] PCT Pub. No.: WO87/04035

PCT Pub. Date: Jul. 2, 1987

[30] Foreign Application Priority Data

Dec. 18, 1985 [DE] Fed. Rep. of Germany ....... 3544797

[51] Int. Cl.⁴ .............................................. H04J 3/02
[52] U.S. Cl. ........................................ 370/85; 370/86; 370/110.1
[58] Field of Search .................. 370/110.1, 86, 60, 94, 370/85, 100

[56] References Cited

U.S. PATENT DOCUMENTS 4,562,573 12/1985 Murano et al. ...................... 370/85
4,592,045  5/1986 Fundneider ...................... 370/110.1
4,686,667  8/1987 Ohnsorge .............................. 370/4

OTHER PUBLICATIONS

DE 3333379 (Fujitsu), Mar. 22, 84.

IEEE Transactions on Communications, vol. COM-29, (Jun 1981), H. Matt et al.
Nachtiehtentechnische Zeitschrift, vol. 27, issue 8, 1974 (Berlin, DE).
The Sixth International Symposium on Subscribers Loop and Services, Oct. 1984, Ono et al.
Article ISDN-Teilnehmer "Die Teilnehmeranschlusstechnik im ISDN", by Schollmeier, pp. 753-762, in Fernmelde-Praxis-19+2/85.

Primary Examiner—Douglas W. Olms
Assistant Examiner—Min Jung

[57] ABSTRACT

This system comprises a passive bus system which, for the incoming direction (NT→TE), contains a ring-shaped bus, whereby the device connector lines branched off it, have the same signal transit times, and for the outgoing direction (TE-NT) contains a bus line terminated in a low reflection fashion. For the combination of the bit currents flowing from, or respectively to the terminal equipment, a time division multiplex super frame is transmitted with the standard bit rate of 139,264 Mbit/s, which, in both directions, is composed of two 8704 bit frame containing a complete picture line respectively, wherein B bits are contained for the two alternately transmitting ISDN-narrow band channels (B1) and (B2) and bits for the frame synchronization (Rahm-Sync), or respectively segment synchronization (Vor). Compared tothe fraame in the incoming direction, the frame in outgoing direction is shifted by 80% of the frame period, and contains one prefix (Vor) respectively between the signals of various sources reaching the receiver of the network termination unit (NT) with different phase relation, this prefix comprising a clock and a subsequent synchronization bit pattern. The D-channel-signalizing bit (D) is transmitted at the frame start and is expanded at least 10-fold and pseudoternarily coded for the purpose of clearly indentifying overlapping impulses of different simultaneously active sources.

7 Claims, 9 Drawing Sheets

SYSTEM FOR THE SIMULTANEOUS OPERATION OF A PLURALITY OF TERMINAL EQUIPMENT AT A NETWORK TERMINATING UNIT OF A BROADBAND NETWORK

BACKGROUND OF THE INVENTION

1. Field of the Invention

The invention is directed to a data transmission system which has an improved data format.

2. Description of the Prior Art

Such a system is known in the form of what is referred to as the ISDN-$S_O$ or S/T interface for the ISDN base terminal of an integrated services digital telecommunications network (Fernmeldepraxis, No. 19/20, 1985, pp. 759–762).

Data transmission systems which utilize bit rates of less than about 200 kbit/s are known in the prior art. The subscriber-line technology in the integrated services digital network is divided into a first area of switching to the subscriber, and into a second area of the installation at the subscriber. A network termination unit NT with a U-interface on the network switching side and a S/T-interface on the subscriber's side, installed at the subscriber, serves as a tie between the two areas. A connection between the network termination unit NT and up to eight terminal devices of the same kind or of a different kind occurs via two pairs of a S-bus. The transmission at the S/T-interface occurs with a bit rate of 192 kbit/s.

SUMMARY OF THE INVENTION

The object of the invention is to expand such a system such that it is employable up to bit rates of 140 Mbit/s upon retention of its performance features, particularly of the D-channel access control which is yet to be set forth.

Figure 1:
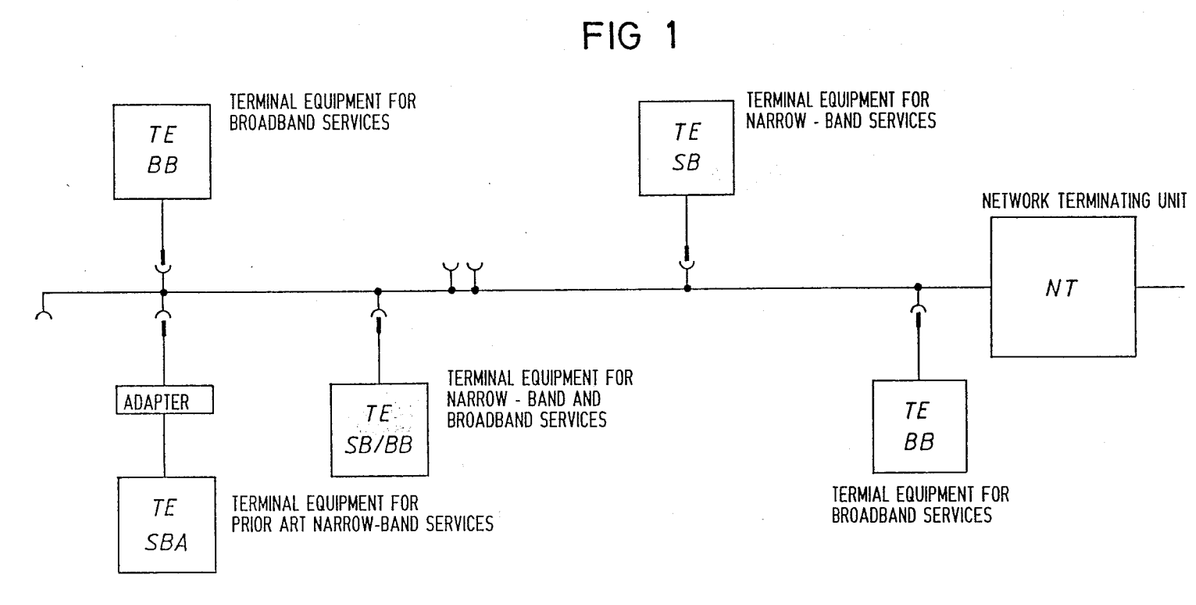
FIG. 1 is a block diagram for explaining the invention.

FIG. 1 illustrates the stated object. The passive bus comprising, for example, eight terminal equipment receptacle sockets and the network terminating unit (NT) as interface to the ISDN which is merely schematically shown in FIG. 1 is to be expanded and re-designed such by the invention that it can process bit rates of about 140 Mbit/s instead of bit rates under 200 kbit/s, i.e. can process, a data rate which is higher by about 700 times. In addition to the D-channel access control and the line lengths for the bus and feeders which are possible in the narrow-band execution, uniform terminal equipment receptacle sockets are also to be provided both for the previous ISDN narrow-band services as well as for the newly added broad-band services. The various, possible connections are illustrated in FIG. 1, namely:

Terminal equipment for narrow-band services (TE SB),
Terminal equipment for broadband services (TE BB),
Terminal equipment for narrow-band and broadband services (TE SB/BB)

As well as for terminal equipment of the prior art structure for narrow-band services (TE SBA) which are to be connected via a special adaptor.

A number of problems caused by the significantly higher bit rate which do not occur in the previous interfaces derive in order to achieve a rated condition shown in FIG. 1. The properties of the known $S_O$ interface shall be discussed in brief below.

Two independent, transparent B-channels (useful channels) each having a rate of 64 kbit/s according to CCITT recommendation I.412 and one D-channel (signaling channel) having a rate of 16 kbit/s are made available in both directions via the $S_O$ interface.

The said channels and further functions are combined into a digital multiplex signal.

The multiplex frame is 48 bits long and lasts 250 µs. A plurality of terminal equipment can simultaneously access the D-channel, whereas every D-channel can be occupied by only one terminal equipment. A procedure was selected for the access onto the D-channel which assures that a terminal equipment can always successfully transmit its information (D-channel access control) even given simultaneous access of two or more terminal equipment to the D-channel. When no information is to be transmitted in the D-channel, continuous status binary 1 is transmitted (quiescent condition). A D-echo channel having 16 kbit/s from the network terminating unit in the direction toward the terminal equipment is used for the D-channel access control. Upon receipt of a bit from the terminal equipment on the D-channel, the network terminating unit should reflect this condition with the next D-echo channel bit to the terminal equipment. Every terminal equipment in the active condition should observe the D-echo channel. It may only access the D-channel when, by counting the successive statuses of binary 1 on the D-echo channel, it has determined that no other terminal equipment has occupied the D-channel. At most, six statuses of binary 1 can follow one another when the D-channel is occupied. A greater plurality of successive status of binary 1 means that the D-channel is free. When two or more terminal equipment simultaneously transmit information on the D-channel, then the pulses superimpose on the line. As long as the terminal equipment transmit identical pulses, the network terminating unit receives the information as though they came from only one source. Given divergent, transmitted pulses, a negative pulse arises on the line due to superimposition, for the matching bits in the multiplex frame see to it that the bits in the D-channel are transmitted only with signal level 0 or with negative signal level. The pulse is recognized by the network terminating unit and is reflected on the Deecho channel. The terminal equipment must observe the received D-echo channel during the information transmission in the D-channel and must compare the respectively last bit transmitted to the next available D-echo bit. When these two bits coincide, the terminal equipment is allowed to continue the transmission. Otherwise, the terminal equipment must immediately abort the transmission and must return into its observation status. Given simultaneous access of two or more terminal equipment onto the D-channel, that terminal equipment which transmits the binary 1 whereas another transmits binary 0 is respectively eliminated. Given the above-described ISDN pilot project, only a few narrow-band services having bit rates of 64 kbit/s are transmitted in a time-division multiplex method, so that this project is also referred to as narrow-band ISDN for short. The bit duration in the multiplex frame amounts to 5.2 µs. In this relatively long time, disturbances due to inter-symbol interference (modification of the pulse shape due to precursors or, respectively, post-pulse oscillations of neighboring pulses) do not come to bear since these disturbances decayed long ago for the decision at the receiver in the bit middle. As a consequence of the short length of the bus which is about 150 meters, neither the frequency-dependent degree of attenuation nor the frequency-dependent envelope delay time of the transmission medium have a noteworthy effect on the pulse shape since the transit time on the bus is significantly shorter than the duration of a bit. For the same reason, chronological shifts of the bits are uncritical within certain limits for the bit superimposition on the D-channel.

When ISDN narrow-band services are then to be transmitted together with broadband services (for example, picture telephony comprising 135 Mbit/s) in a common time-division multiplex frame (broadband ISDN ISDN-B), then a passive bus in the same form as in the narrow-band ISDN is no longer possible.

Given a bit duration on the order to 10 ns (corresponding to 140 Mbit/s), the following disturbances occur:

(a) Transit time difference: The signal transit time between the terminal equipment at the greatest and that at the shortest distance from the network terminating unit can be considerably greater than ½ bit duration. This difference in transit time takes effect in both transmission directions, so that it is twice as great at the network terminating unit. The multiplex frames transmitted from terminal equipment at different distances from the network terminating unit can arrive at the network terminating unit chronologically shifted by more than one bit relative to one another. A pulse arriving at the network terminating unit can then no longer be unambiguously assigned a bit position in the frame.

(b) Inter-symbol interference (ISI): As a consequence of the frequency-dependent, linear distortions of the transmission medium, precursors and post-pulse oscillations can arise with respect to the pulse centers of gravity, these then extending into the centers of gravity of the neighboring pulses and potentially simulating false signals there. A complete elimination of the precursors and post-pulse oscillations is only possible for a fixed length of the transmission medium. The pulse shaping can be undertaken such that an amplitude-wise pulse recognition is still possible even given divergent lengths.

(c) Phase shift of the pulse centers of gravity due to frequency-dependent envelope delay time: As a consequence of the frequency-dependent envelope delay time of the transmission medium, the pulse centers of gravity arriving at the network terminating unit from transmitters at different distances have different phase relations. The clock in the receiver of the network terminating unit may therefore not be phase-locked but must be able to adjust to changing phase relations (clock phase matching).

(d) Disturbing overlay of pulses of simultaneously active sources: A plurality of transmitters can be simultaneously active in the D-channel, but the receiver in the network terminating unit cannot simultaneously adjust to a plurality of phase relations. Moreover, the voltage-related overlay of already distorted pulses having the bit duration of about 10 ns leads to an even greater deformation of the resulting pulse, so that an error-free detection becomes impossible at the high bit rate.

Apart from the inter-symbol interference for which a separate solution is proposed, the above-recited disturbance possibilities a, c and d are overcome by the feature combination recited in patent claim 1 and, thus, the object of the invention is achieved. Advantageous developments are recited in patent claims 2 through 7.

Advantages

The differences in transit time are compensated by the ring-shaped bus structure in one transmission direction. The section synchronization allows a reliable synchronization of signals successively arriving from different sources, even signals having different coding. As a result of a significant increase in the bit duration and of AMI-like coding of the D-channel bit in outgoing direction, an unambiguous recognition of overlay signals from simultaneously active sources is possible.

Taken together, all measures allow the retention of the D-channel access control despite the bit rate increased about 700-fold and allow the use of uniform terminal equipment receptacle sockets for narrow-band and broadband services in a broadband network (ISDN-B). Transmission equipment are already available for the transmission bit rate of 139.264 Mbit/s standardized by the CCITT.

The invention shall be set forth in greater detail below with reference to nine figures. Shown are:

BRIEF DESCRIPTION OF THE DRAWINGS

FIG. 8b is a time diagram for the E-bits or, respectively, D-bits on the line sections shown in FIG. 8a.

DESCRIPTION OF THE PREFERRED EMBODIMENTS

Figure 2:
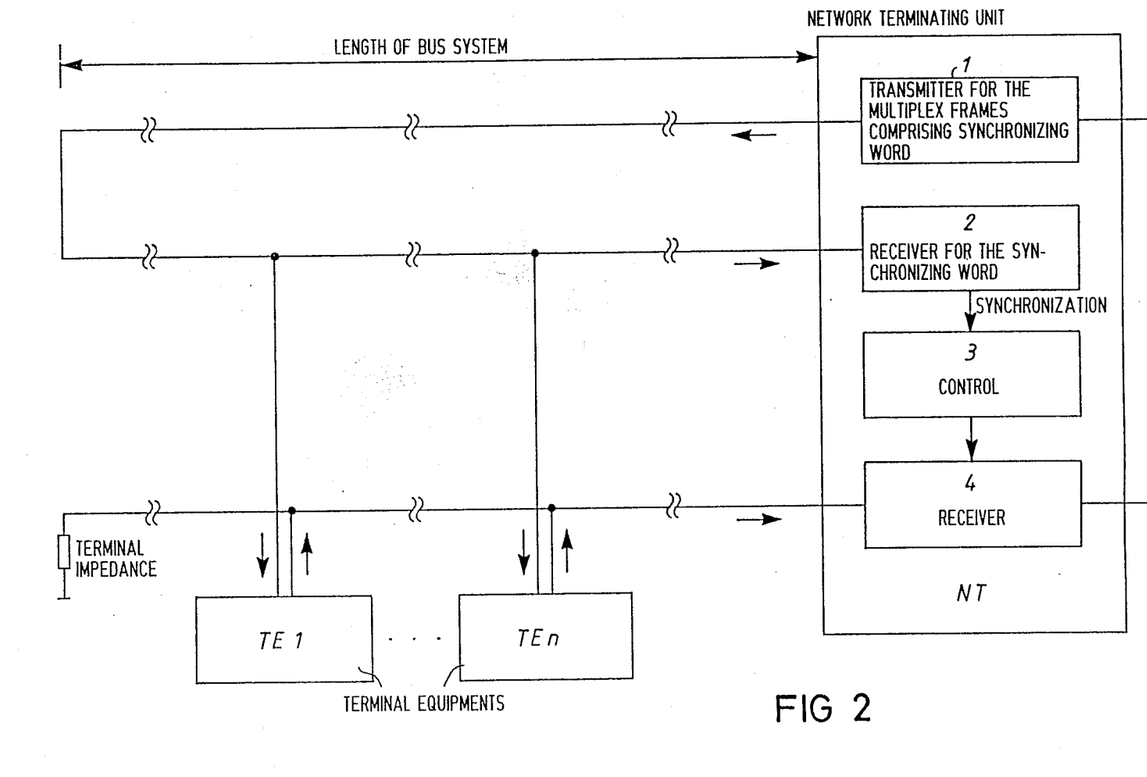
FIG. 2 illustrates the basic structure of a broadband, passive bus system of the invention.

FIG. 2 shows the structure of the broadband, passive bus system as well as the functions of the network terminating unit (NT). The bus system is composed of three lines proceeding in parallel of which the upper two are interconnected such that at their end that a loop arises. The third line is terminated in low-reflection fashion at its end.

The transmitter (1) in the network terminating unit (NT) transmits multiplex frames comprising synchronizing word onto the loop to all connected receivers of the subscriber terminal equipment (TE1 through TEn) which each also contain a controlled transmitter. The receivers are connected to the returning line of the loop and receive the signal conducted via the loop to the end of the bus. The transmitters of the subscriber terminal equipment (TE1 through TEn) transmit their signal to the network terminating unit (NT) on the direct route via the third line. What is therewith achieved in addition to a de-coupling of the transmission directions is that the sum of the signal transit times from the network terminating unit (NT) to the receivers of the subscriber terminal equipment (TE) and from the transmitters of the subscriber terminal equipment (TE) to the network terminating unit (NT) is the same for all subscriber terminal equipment regardless of the respective distance between network terminating unit (NT) and subscriber equipment (TE).

Both the subscriber terminal equipment (TE1 through TEn) as well as the receiver (4) in the network terminating unit (NT) are synchronized to the transmitter (1). A separate receiver (2) for the synchronizing word is connected at the loop end in the network terminating unit (NT). Via a control (3), this separate receiver (2) synchronizes the chronological execution in the receiver (4) for the signals of the subscriber terminal equipment (TE).

Figure 3:
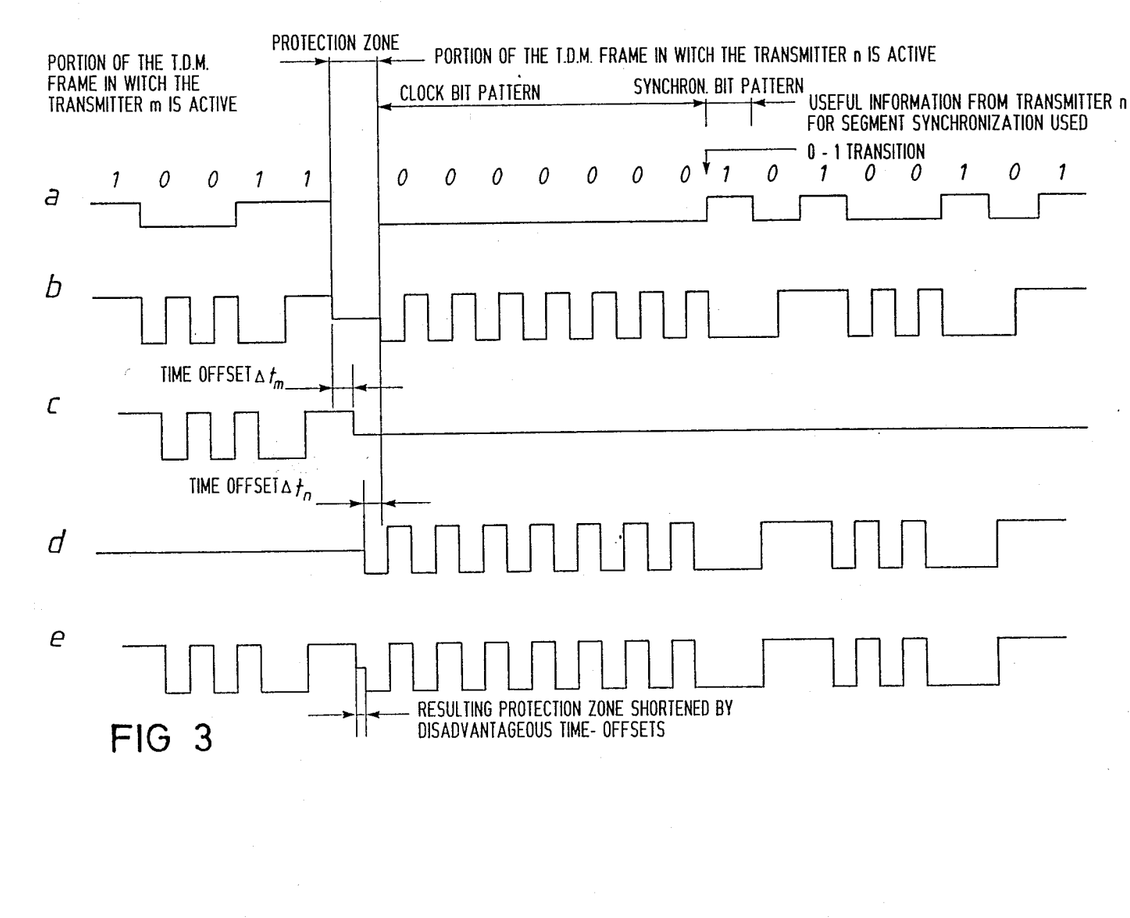
FIG. 3 illustrates the functioning of the section synchronization with reference to a pulse diagram.

In its left-hand part, the pulse diagram of FIG. 3 contains a portion of the time-division multiplex frame in which the transmitter m is active and the right-hand part thereof contains a portion in which the transmitter n is active. A phase skip generally arise at the receiver of the network terminating unit at the boundary between two time segments in which different sources are active. In order to give the receiver time to set to the new phase relation, a time span (pre-span) which contains no useful information is additionally inserted between the sections. The pre-span is composed of two parts. The first part is formed by a clock bit pattern comprising many clock information, i.e. comprising many edge changes of the pulses. As a result thereof, the clock generator for the receiver is set to the new phase relation (clock phase matching).

The length of the bit pattern is determined with the transmission code (number of edge changes per bit) and with the quality of the clock oscillator. It is generally true: The oscillator requires more bits in order to be set to the new phase relation the higher the quality of the oscillator.

The second part of the pre-span is formed by a synchronizing bit pattern in which the beginning of the following time segment for the useful information in the multiplex frame is marked (segment synchronization). It must clearly differ from the clock bit pattern so that the boundary between the two bit patterns is immediately recognizable. This boundary is used as reference point for the segment synchronization. The length of the synchronizing bit pattern is based on the transmission code employed. Given CMI coding, for example, the clock bit pattern can be composed of a string of zeros. A single bit having binary 1 (see FIG. 3) then already suffices as the synchronizing bit pattern. The 0-1-transition effects the segment synchronization. After the clock phase matching, thus, only the first logical 1 following the zero string must be checked in order to identify the beginning of the information-containing time segment. It is also shown in FIG. 3 that a protection zone is established between the two sections of the time-division multiplex frame in which the transmitters m and n are active in order to intercept the time offsets of the signals arriving at the receiver.

In the first line a, the pulse diagram of FIG. 3 shows an example of a bit sequence which is to be transmitted. The line b shows a CMI signal of both transmitters at the receiver in the ideal case, without time-offset. The line c shows the signal of the transmitter m arriving at the receiver with a time-offset $\Delta tm$. The line d shows the signal of the transmitter n arriving at the receiver with a time-offset $\Delta tn$. Line e, finally, shows the CMI signal of both transmitters as it arrives at the receiver in the non-ideal case. It can be seen that the protection zone can be significantly shortened by unfavorable time-offsets.

In addition to the needed section synchronization, there is also the actual frame synchronization which ensues such that the network terminating unit transmits a synchronizing word as a frame start character and receives it again via the ring bus. The network terminating unit is thus set to the respective signal transit time on the bus.

Also added thereto are the transit time of the terminal equipment connecting lines and the response times of the terminal equipment whose sum, however, must always be identical for all terminal equipment. The ratio of information-free times to information carrying times must be kept so small that the increase in the transmission bit rate which is caused thereby remains acceptable.

Figure 4:
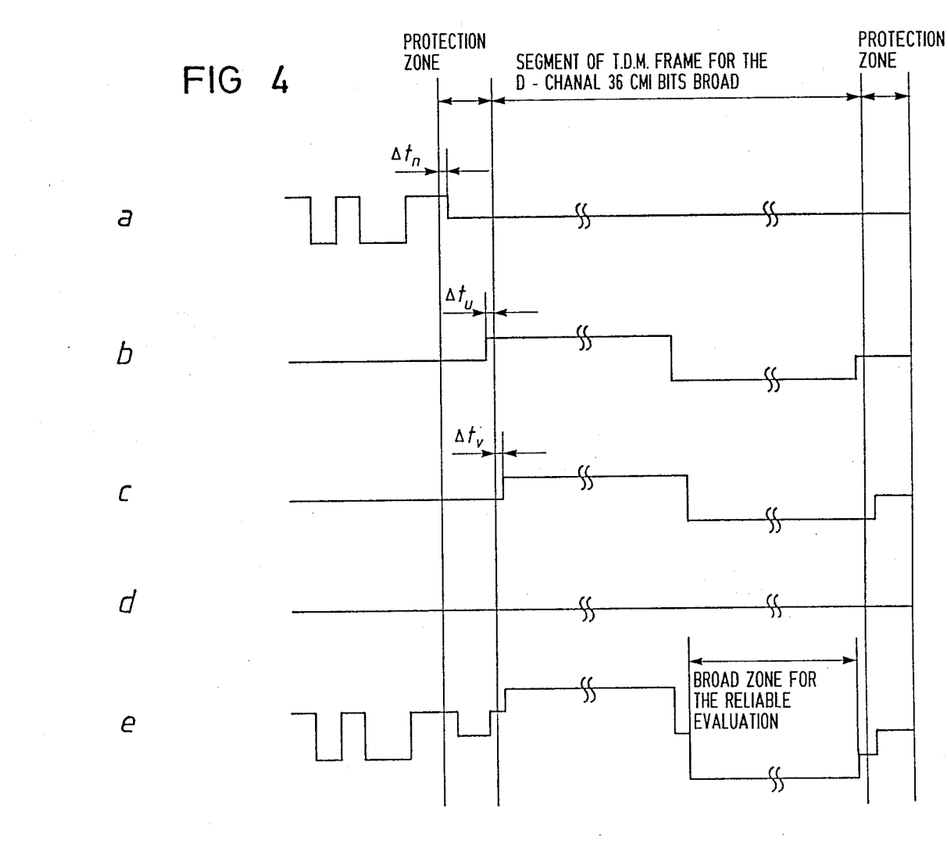
FIG. 4 is a pulse diagram which illustrates the overlay of AMI-coded pulses given simultaneous access of a plurality of transmitters on the D-channel.

In defined bit positions of the multiplex frame, a plurality of spatially separate transmitters are allowed to be simultaneously active (for example, D-channel bits). The pulses from these transmitters overlay at the network terminating unit to form an overall pulse. As a result of the differing phase relation of the in-coming pulses and as a result of differing, length-dependent amplitude distortions, the overall pulse can no longer always be recognized as error-free. What is achieved by a brief increase in the bit duration from the order of 10 ns to the order of 100 ns is that the regions of discrimination uncertainty remain limited to the bit boundaries and a decision is possible in the bit middle. This increase in the bit duration means a reduction in the momentary transmission bit rate, i.e. the multiplex frame contains regions of different bit rates. An insertion of an information-free time segment (pre-span) is not necessary before the bit spread because the time for the bit decision is fixed with adequate precision and chronological fluctuations are ineffective due to the relatively great bit width. Various transmission codes that are optimally adapted to the respective regions can also be selected for the regions varying in bit rate. Different transmission codes may thus also be employed within a multiplex frame. FIG. 4 shows an example of the bit spread as proposed here for the D-channel. The pulse diagram of FIG. 4 shows the overlay of the voltage pulses for the D-channel pending at the receiver (4) of FIG. 2 in the case where a plurality of transmitters are signaling simultaneously.

In FIG. 4 line shows the CMI signal of the transmitter m which is active in the time segment preceding the D-bit. As in FIG. 3, the protection zone then follows. The following section of the time-division multiplex frame which is 36 CMI bits broad is reserved for the D-channel signaling bit.

FIG. 4, line b, shows, 2 bits in modified AMI code are placed in this time span. The line b shows the AMI signal of a transmitter u which transmits in the D-channel, this AMI signal arriving with a leading time offset $\Delta tu$ in comparison to the ideal position ($\Delta tu=0$).

FIG. 4, line c shows the AMI signal of a further transmitter v which likewise access the D-channel and which arrives with a trailing time offset $\Delta tv$.

When a terminal equipment has 0 nothing or binary 1 to signal in the D-channel, then the signal level remains 0, as shown in line d. The transmission of AMI bits in the D-channel ensues with the dc-free sequence $+1-1$ or 00.

The sum signal obtained by superimposition of the signals of all transmitters is shown in line e. Given this signal, the evaluation can occur, for example, in the middle of the negative bit as shown in line e.

Given a transmission bit rate of, for example, 140 Mbit/s, a momentary transmission rate of 140 Mbit/s(36/2)26 7.8 Mbit/s results for the time segment of the bit spread, this corresponding to a basic frequency of 3.9 MHz. Given this relatively low frequency, AMI signals can be employed on coaxial cables about 100 m long as the transmission medium for the voltage overlaying.

Figure 5:
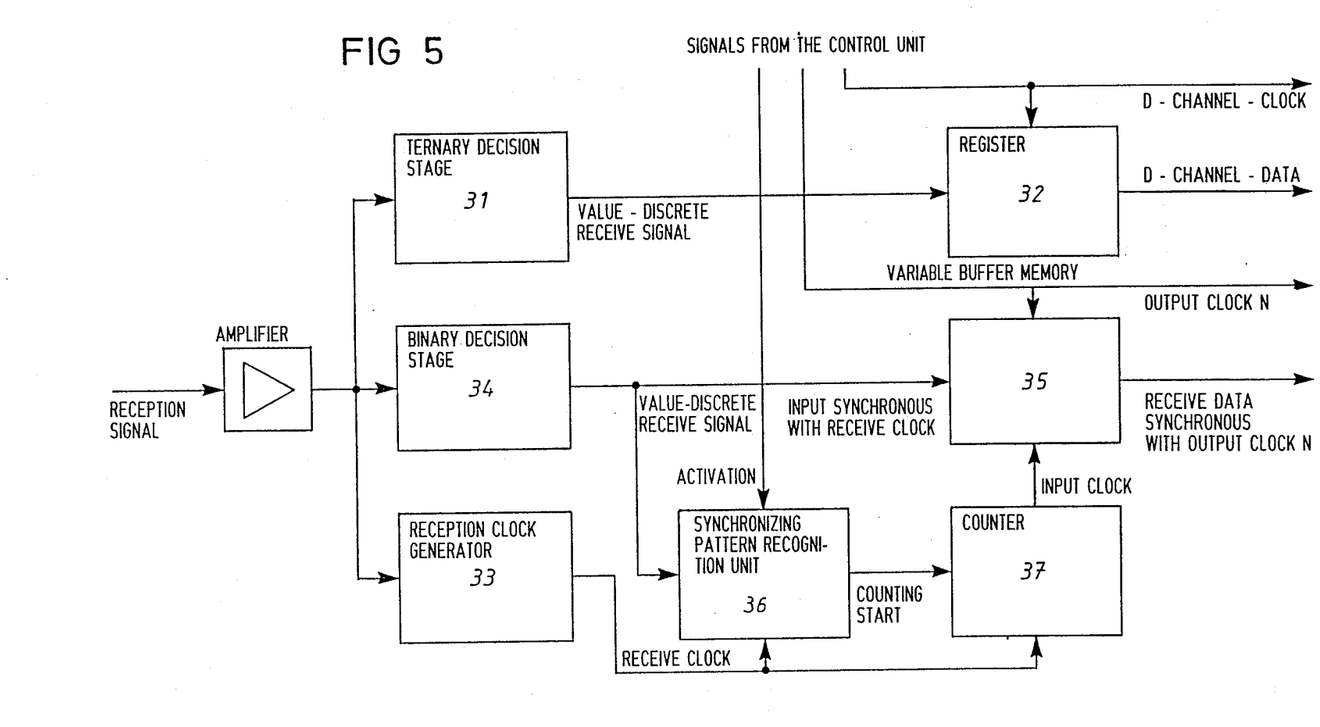
FIG. 5 is a block circuit diagram of the receiver (4) of the network terminating unit (NT) of FIG. 2.

FIG. 5 shows the function blocks of the receiver (4) shown in FIG. 2 in the network terminating unit (NT) for signals of different transmitters having different momentary bit rates. The receiver control (3) shown in FIG. 2 supplies to a frame synchronization for the receiver (4). It operates with adequate precision in order to sample the individual time sections in the region of the opened eye. The amplified reception signal proceeds, first, via a ternary decision stage (31) to the register (32) for a D-channel bit where the D-channel bit is strobed at the correct time specified by the control unit. In addition to receiving the signals having low momentary bit rate, the receiver must also receive the binarily coded signals having a high bit rate from various transmitters. To that end, the receiver must re-adjust to the respective phase relation at the beginning of each and every time segment. For this purpose, the reception signal is supplied to a lockable reception clock generator (33) which adapts to the respective phase relation and is also supplied to a binary decision stage (34) (threshold detector). The binary decision stage outputs a binary signal that is conducted to a variable buffer memory (35) and to a synchronizing pattern recognition unit (36) assures section synchronization.

At a time when, due to the pre-span, the clock must already have locked into the correct phase relation, the receiver control unit activates the synchronous pattern recognition circuit (36). This searches in the reception data stream for the bit pattern for the section synchronization. As soon as it has found it, it starts the following counter (37) and deactivates itself. The counter (37) counts off m bits in the discrete-value reception signal, where m is the plurality of useful bits in the respective time segment of the multiplex frame.

The received bits are introduced into a variable-size buffer memory (35) in the counting clock. The buffer memory (35) is read out with a clock generated by the control unit. The output clock is thus free of the phase variations of the reception clock.

In the specific instance of the broadband interface (SBB), the following bit streams must be combined in time-division multiplex:
16 kbit/s for the D-channel in both directions for the signalling;
16 kbit/s for the D-echo channel from the network terminating unit in the direction toward the terminal equipment for the D-channel access method;
64 kbit/s for the B1-channel in both directions for the useful information;
64 kbit/s for the B2-channel in both directions for the useful information;
Bit stream for the activation/deactivation of the terminal equipment from the network terminating unit in the direction toward the terminal equipment;
135 Mbit/s for the broadband channel in both directions for the moving picture transmission (picture telephony BiFe);
Bit streams for the frame and line synchronization and potential audio in both directions.

It is already known to employ the standard bit rate of the fourth stage of the PCM hierarchy of 139.264 Mbit/s for this purpose, this being constructed on the basis of 2.048 Mbit/s systems. Given a bit rate requirement of about 135 Mbit/s for the moving picture transmission, adequate space still remains for two narrow-band channels and for the required control and synchronization (NTZ 38(1985), No. 3, p. 143). The invention likewise employs this standard bit rate. Since it is a multiple of 64 kbit/s, a stuffing both in the narrow-band channels as well as, in particular, in the D-signalling channel can be avoided as a result of the multiplex frame structure set forth below.

The question of the repetition frequency of the multiplex frame now arises. Insofar as possible, only one D-bit should be contained per frame because of the D-channel access control and, accordingly, only one D-echo bit should be contained as well. At the same time, it is desirable to transmit a complete picture line per frame. One arrives at a frame repetition frequency of 16 kHz using these considerations. The plurality of bits for the two B-channels is thus also determined as four bits each ($=\frac{1}{2}$ PCM sample). However, when one wishes to have a word-by-word transmission for the B-channels, then a super-frame having the repetition frequency of 8 kHz is formed which contains two frames that can be distinguished in that the first frame contains the synchronizing word and the second frame contains the answer back word. The transmission of the B-channels then occurs in alternation, with 8 bits (=full PCM sample) in the first frame, for example B1, and likewise with 8 bits in the equidistant rhythm in the second frame B2.

The time available for the transmission of a frame is 40 ms as determined from the frame frequency of 25 Hz. 640 multiplex frames are transmitted during this time given a multiplex frame repetition frequency of 16 kHz. Of these, 625 frames each contain 1 picture line; the remaining 15 frames are free for future employment purposes. This corresponds to a free transmission capacity of 8640 bits ×15 frames× 16 kHz/640 frames=3.24 Mbit/s. When all lines of a field are transmitted in successive time-division multiplex frames and the fields are equidistantly transmitted, then a frame or, respectively, line memory can be superfluous when using a modern television set which adapts to the respective line frequency.

The signal coding on the bus is in the CMI code (coded mark inversion: the binary value 1 is alternately represented by a positive and by a negative polarity and the binary value 0, regardless of the preceding bit, and it is represented by a negative polarity in the first half and by a positive polarity in the second half of the bit interval). Only in the direction from the subscriber terminal equipment to the network terminating unit is the CMI coding abandoned in the time segment for the D-channel bit for the purpose of pulse overlaying and when a change to AMI code having the greatest possible bit duration is undertaken.

Figure 6:
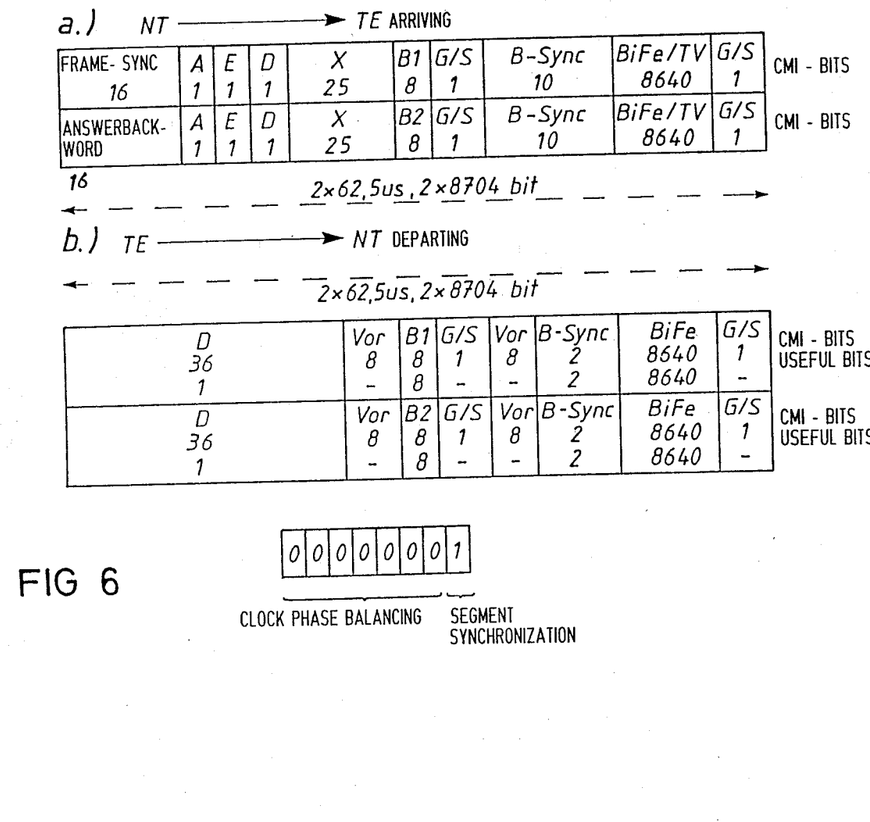
FIG. 6 is the structure of the multiplex frame for both transmission directions.

FIG. 6 shows the structure of the time-division multiplex frame for both transmission directions. The time segments of each and every channel are thereby equidistantly arranged in the multiplex super-frame. The multiplex frames or, respectively, super-frames are of identical length for both transmission directions.

The individual time segments of the multiplex frame denote:

Direction coming from network terminating unit → Terminal Equipment:

Frame Synchronizing Word (Frame Sync): The frame synchronizing word is only transmitted from the network terminating unit to the terminal equipment and identifies the beginning of the first frame in the super-frame. It contains 16 bits, this establishing an adequately low probability that it will occur again at some other location given synchronizing in the super-frame. After the terminal equipment have recognized the synchronizing word, they need not check it again until after a full length of the super-frame. Every inherently dc-free bit pattern is allowed for the synchronizing word, for example, the bit sequence 0010111010011010. The repetition frequency is 8 kHz.

Answerback Word: The second frame in the super-frame from the network terminating unit in the direction toward the terminal equipment contains an answerback word 16 bits long at the location of the frame synchronizing word and, this answerback word differs from the frame synchronizing word by at least one bit. What frame of the super-frame is then being transmitted and what B-channel is taking its turn are thus determined. The repetition frequency is 8 kHz.

Activation Bit (A) The A-bit tells the terminal equipment whether the connection between the network terminating unit and the terminal equipment is properly set-up, i.e. the slice 1 of the OSI reference model of the ISO is to be considered operationally ready, as in the narrow-band ISDN (Harold C. Folts, McGraw-Hill's Compilation of DATA COMMUNICATIONS STANDARDS, Edition II, (1982), Part 2, pp. 521–532). The A-bit is transmitted only from the network terminating unit in the direction toward the terminal equipment. The repetition frequency is 8 kHz.

D-Echo Channel (E): One bit is required for the D-channel access control, this reflecting the D-bit received in the network terminating unit. In the active condition, the terminal equipment constantly observe the E-bit and compare it to their transmitted D-bit. That terminal equipment which determines the identity of the two bits is allowed to continue transmitting. All remaining terminal equipment have no access to the D-channel or, respectively, must immediately abort their transmission. The D-echo channel has a bit rate of 16 Kbit/s and is used only by the network terminating unit in the direction toward the terminal equipment.

D-Channel (D): The D-channel is the shared signalling channel for all services. It has a bit rate of 16 kbit/s. In the direction toward the terminal equipment, 1 CMI bit for the D-channel is transmitted per multiplex frame. The D-channel bit is followed by 25 free bits (X) for arbitrary utilization which are here inserted in departing direction for matching to the frame.

Arriving Narrow-Band Channels (B1, B2): The useful channels (B1) or, respectively, (B2), follow for the narrow-band services having a bit rate of 64 kbit/s each. 8 bits of the B1 and, respectively, of the B2 channel are transmitted in alternation in every frame. The useful channel (B1) or, respectively, (B2) is followed by a protection zone bit (G/S) to be explained in detail later.

Synchronizing Bits for Line Position and Frame Start (B-Sync): For the broadband service (BiFe or TV), a criterion must be cotransmitted for the picture screen line number or, respectively, for the start of a field or/and frame. 10 bits are reserved for this purpose from the network terminating unit in the direction toward the terminal equipment. That suffices for numbering the 640 single frames.

Useful Channel for the Broadband Service (BiFe/TV): One time segment comprising 8640 bits is available in the frame for the broadband service (BiFe or TV in the direction toward the terminal equipment). This bit plurality corresponds to one picture line given the above-presented moving picture coding. Of 640 transmitted frames, only 625 frames = 625 lines are used for the image transmission. In the remaining 15 frames, these time segments are available for other services, as already set forth above. The relationship of 625 frames for picture transmission to 15 frames for other services is time-invariable. The bit rate of this useful channel amounts to 138.240 Mbit/s.

Departing Direction Terminal Equipment→Network Terminatinq Unit:

D-Channel (D): In the opposite direction, the multiplex frame begins with the time segment for one D-channel bit (D). It has the duration of 36 CMI bits. In it, 2 AMI bits are transmitted with the momentary bit rate of about 7.8 Mbit/s. However, they only carry the information of one D-bit.

Pre-Span (Vor): Every source that wishes to transmit useful information must first send out a pre-span (Vor) of a few CMI bits so that the receiver in the network terminating unit can set to the new phase relation of the pulses. The pre-span (Vor) has the bit sequence 00000001. The CMI-coded zeros contain much clock information for the recovery of the clock. The change from 0 to 1 informs the receiver of the beginning of the time segment to be evaluated (segment synchronization). The pre-span (Vor) is only needed when a plurality of sources at different locations access the passive bus. This is only the case in the direction toward the network terminating unit. In the direction toward the terminal equipment, the full frame comes from one source, namely from the transmitter in the network terminating unit, so that the pre-span is omitted.

Departing Narrow-Band Channels (B1, B2): The narrow-band channels (B1) or, respectively, (B2) follow, each comprising 8 bits, and these are again followed by a protection zone bit (G/S).

Broadband Channel: In the departing direction, the time segment for the broadband channel begins with a pre-span (Vor) that is 8 bits long. Two bits for field and frame identification (B-sync) follow and, as in the arriving direction, the 8640 bits for picture telephony (BiFe) then follow. The frame closes with the G/S bit to be set forth below.

DC-Compensation/Protection Zone Bit (G/S): At those locations in the multiplex frame at which one source ceases transmission and another begins to transmit, a bit falsification can occur when the pulse centers of gravity of the signal of the ceasing source arrive tardy and those of the signal of the beginning source arrive early at the network terminating unit (cf. FIG. 3). The information of the last bit of the ceasing source can be falsified by pulse overlaying. A protection zone bit (G/S) is therefore inserted at every location in the frame at which the jurisdiction of one source having the bit rate 139.264 Mbit/s can end. This applies to the transmission direction from the terminal equipment to the network terminating unit. Since the frame used in the opposite direction should be identically constructed to the greatest possible degree, corresponding G/S bits are also arranged. Given employment of a transmission code which is not dc-free bit-by-bit, these bits can be used as dc-compensating bits, as is the case given CMI coding. What is achieved by the G/S bit at the end of the frame for the direction toward the terminal equipment is that the frame synchronization and answerback words always have the same CMI pulse sequences. As a consequence of the dc-free AMI pulse sequence, no separate dc-compensating bit is required in the time segment for the D-channel and no protection zone bit is required due to the great bit duration.

Figure 7:
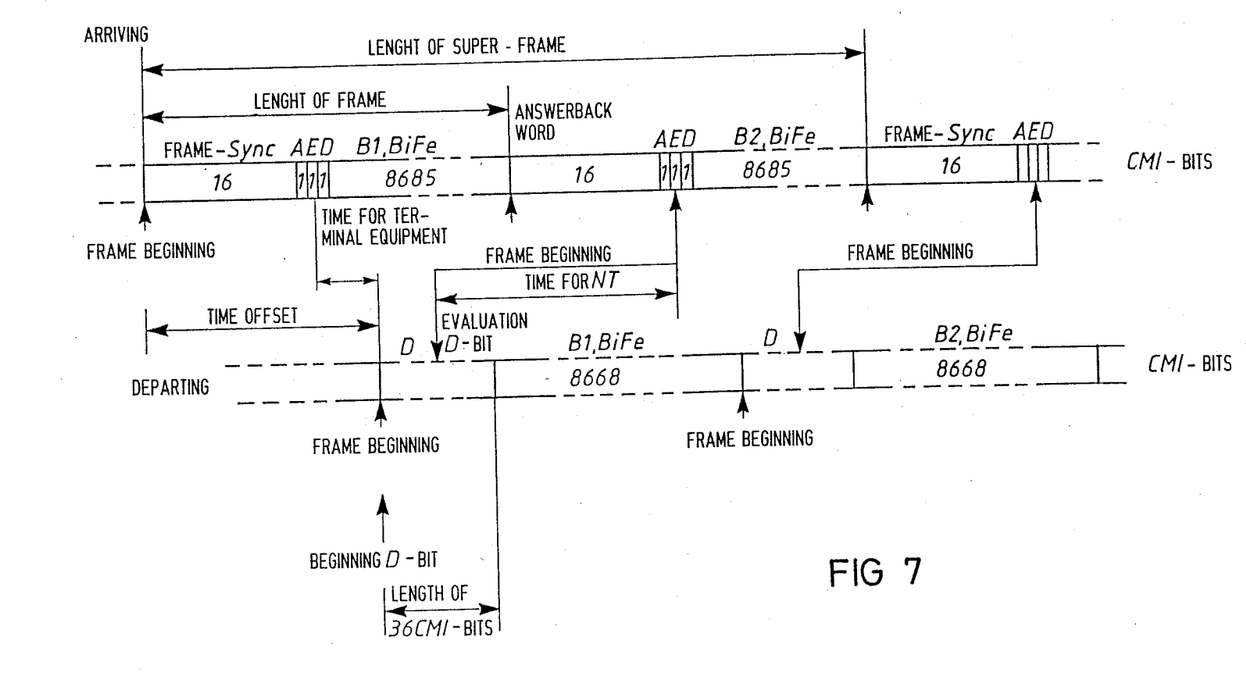
FIG. 7 illustrates the chronological offset of the outgoing super-frame in comparison to the in-coming super-frame.

The chronological relationship between a arriving and a departing multiplex frame is shown in FIG. 7 for that case wherein narrow-band ISDN terminal equipment already existing are not to be connected to the bus. The chronological offset of the two frames shown is for has the following reason: The method of D-channel access control presumes that the terminal equipment have adequate time for the evaluation of the D-echo bit before transmitting the next bit. Second, the receiver in the network terminating unit must return the received D-bit to the terminal equipment together with the next D-echo bit (E-bit), as marked in FIG. 7 by the arrows from D to E. These conditions are met in that the multiplex frame from the terminal equipment to the network terminating unit is chronologically shifted by about ½ a frame length in comparison to the frame from the network terminating unit to the terminal equipment. From the time of the evaluation of the received bit up to the beginning of the time segment for the next E-bit to be transmitted, the network terminating unit has time to decide what logical status this E-bit must assume. For example, the evaluation time for the D-bit in the direction toward the network terminating unit can lie in the middle of an MI pulse. Due to the chronological offset by about ½ a frame between forward and return frame, the decision times for the network terminating unit and for the terminal equipment are of about equal length.

Figure 8A:
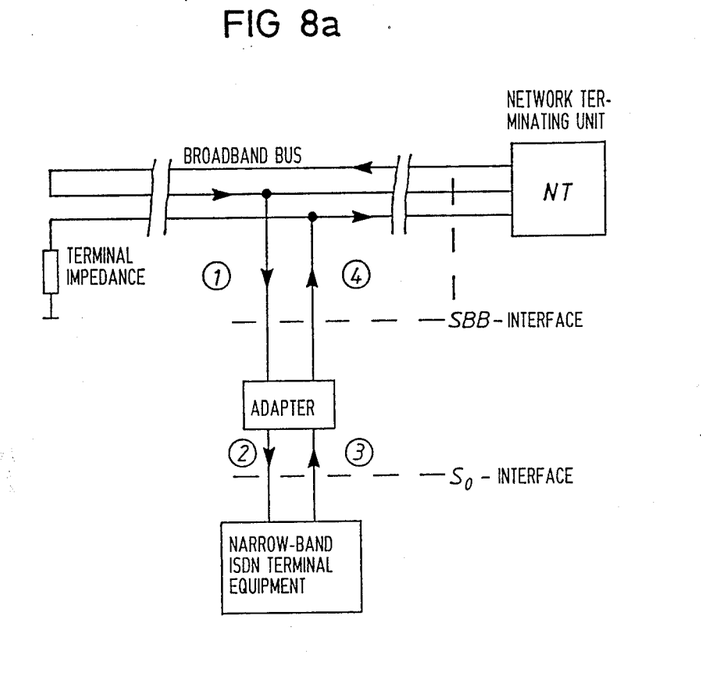
FIG. 8a shows the connection of a previous narrow-band ISDN terminal equipment to the broadband bus.
Figure 8B:
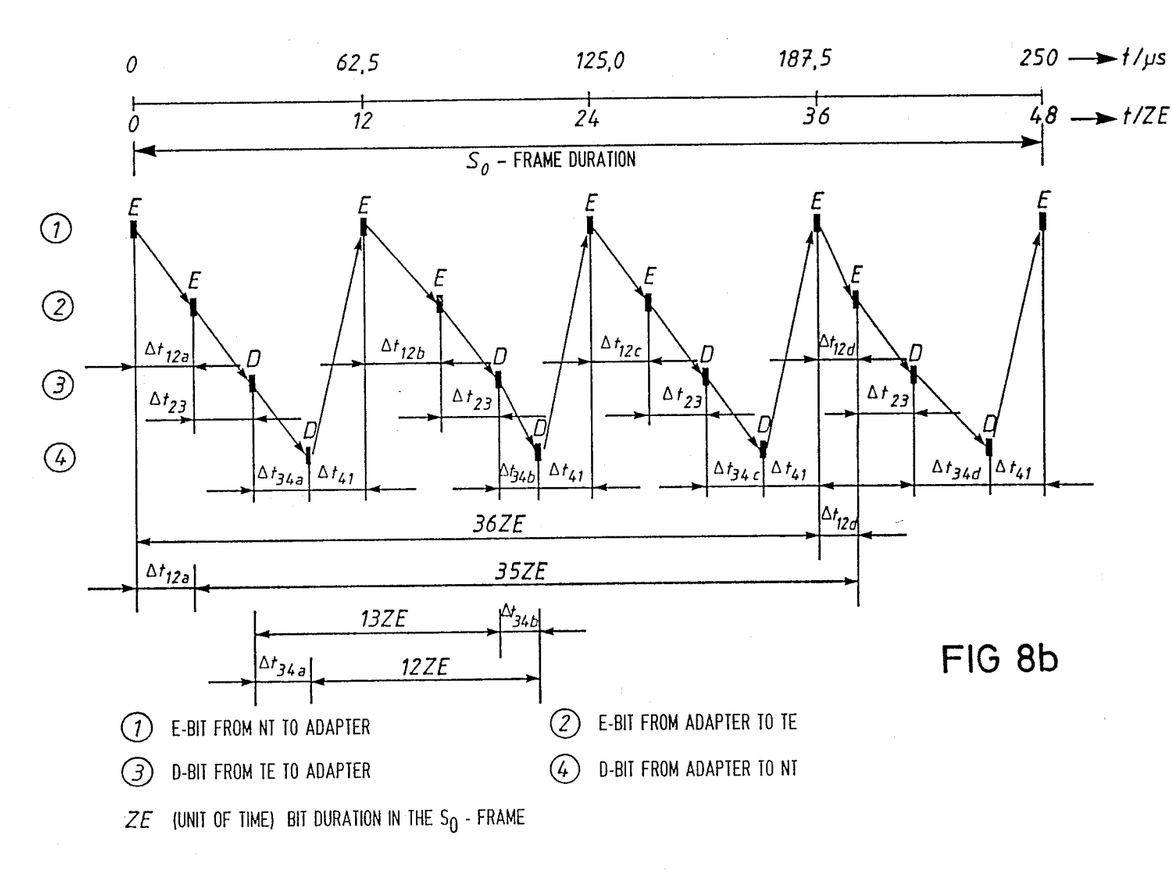

When $S_O$-interfacable narrow-band ISDN terminal equipment are to be connectable to the broadband bus of FIG. 8a via adaptors, then the adaptor must also be granted time for the conversion of the signals. The overall time available must then be distributed as uniformly as possible to the network terminating unit (NT), the adaptor and the narrow-band ISDN terminal equipment. What response time the terminal equipment should have is already defined in the specification of the $S_O$ interface. The time still remaining, as shown in FIG. 8b, is divided roughly uniformly for the network terminating unit and the adaptor. A time offset of about 80% of the frame duration thus results, i.e. 50 μs, by which the frame incoming to the network terminating unit is delayed in comparison to the frame out-going from the network terminating unit.

It is assumed for the concept of the multiplex frame that the narrow-band ISDN terminal equipment already existing should be connectable to the broadband bus. The time of 50 μs is therefore suggested for the shift of the multiplex frames. FIG. 8a shows the connection of a narrow-band ISDN terminal equipment to the passive broadband bus via an adaptor. The adaptor has the job of converting the broadband interface (SBB) into the $S_O$ interface and vice versa. The cooperation of the received E-bits with the D-bits to be transmitted is the determining factor for the chronological shift of the multiplex frames for the two transmission directions. This chronological relationship is shown in FIG. 8b. To this end, the individual line sections are referenced 1 through 4 in FIG. 8a.

The time differences $\Delta t_{ij}$ and $\Delta t_{ijk}$ (i,j = 1 ... 4, k=a ... d) FIG. 8b contain the time from the beginning of a bit at the respective receiver up to the decision, the processing time and the respective equipment, and the signal transit time up to the receiver of the respectively following equipment. Denoting in detail are:

$\Delta t_{12}$: Time between arrival of the E-bits at the adaptor and arrival of the E-bit at the terminal equipment $\Delta t_{23}$: Time between arrival of the E-bit at the terminal equipment and arrival at the D-bit at the adaptor $\Delta t_{34}$: Time between arrival of the D-bit at the adaptor and arrival of the D-bit at the network terminating unit $\Delta t_{41}$: Time between arrival of the D-bit at the network terminating unit and arrival of the next E-bit at the adaptor.

Because each of the 250 μs-long multiplex frames of the $S_O$ interface contains four E or, respectively, D-bits and these are not equidistant, FIG. 8b shows the time span of a full $S_O$ frame which is equivalent to 4 frames on the broadband bus. Because of the non-equidistant position of the E or, respectively, D-bits in the $S_O$ frame, four cases must be distinguished at the transitions from 1 to 2 and from 3 to 4, these being indicated with a through d. The respectively shortest time difference, i.e. $\Delta t_{12d}$, $\Delta t_{34b}$ and $\Delta t_{41}$, are the determining factors for the time offset between the frame 1 and 2 or, respectively, between the frame 3 and 4 or, respectively, between the frame 4 and 1. The time between two successive E-bits in frame 1 (transmitted from the network terminating unit) is constant and amounts to 62.5 μs. As proceeds from FIG. 8b, valid is:

$$\Delta t12k + \Delta t23 + \Delta t34k + \Delta t41 = 62.5 \text{ μs (for all k)}.$$

The time difference $\Delta t_{23}$ is rigidly prescribed by the specification of the $S_O$ interface. It is calculated at:

$$\Delta t23 = (250 \text{ μs/frame})/(48 \text{ bit/frame}) \times 3 \text{ bit} = 15.625 \text{ μs}.$$

As may be seen from FIG. 8b, the following equations apply:

$$\Delta t12a + \Delta t23 + \Delta t34a + \Delta t41 = 62.5 \text{ μu} \quad (1)$$

$$\Delta t12a + 35 \text{ ZE} = 36 \text{ ZE} + \Delta t21d \quad (2)$$

$$\Delta t34a + 12 \text{ ZE} = 12 \text{ ZE} + \Delta t34b \quad (3)$$

$$1 \text{ ZE} - 250 \text{ μs}/48 \quad (4)$$

In order to grant the participating equipment (network terminating unit and adaptor) processing times of about the same size, the determining time differences $\Delta t_{12d}$, $\Delta t_{34b}$ and $\Delta t_{41}$ should be of approximately the same size. Hence, the demand:

$$\Delta t21 \text{ d} = \Delta t34 \text{ d} = \Delta t41 \quad (5)$$

Obtained from equations (1) through (5) is:

$$\Delta t12d = \Delta t34b = \Delta t41 = 12.1527 \ldots \text{ μs}. \quad (6)$$

When the signal transit time from the network terminating unit to the adaptor is left out of consideration, then $\Delta t_{41}$ is also the time from the reception of a D-bit up to the transmission of a E-bit by the network terminating unit. The middle of the E-bit and the middle of the same D-bit lie at approximately the same location in the respective frame. The time offset of the frame should therefore roughly correspond to the time offset of the said bits ($\Delta t41$). This value corresponds to about 1/5 of the frame duration, i.e., the frame transmitted from the network terminating unit is delayed by 20% of the frame duration in comparison to the received frame. Due to the periodicity of the frame, this is equivalent to a delay of the frame transmitted by the terminal equipment or, respectively, adaptor by 80% of the frame duration, corresponding to 50 µs, in comparison to the received frame.

We claim:

1. System for the simultaneous operation of a plural number of terminal equipments (TE) by means of bit currents at a network terminating unit (NT), which has a receiver (4) which receives signals from a common D-channel of different terminal equipment (TE), characterized in that:
   a. a loop-shaped bus having an outgoing direction portion and an incoming direction portion and extending between said terminating unit (NT) and said terminal equipments, a single bus line for connecting said terminal equipments with said network terminating unit (NT) and terminated in low-reflection fashion at its end, a plurality of equipment connector lines each connected to one of said terminal equipments (TE) and branched off from said loop-shaped bus line and said single bus line so as to provide identical signal transit times;
   b. said terminal equipment generating signals in respective time slots and data bit streams flowing from or, respectively, to said terminal equipment are combined using a time-division multiplex super-frame containing two ISDN narrow band channels B1 and B2 which is transmitted with the standard bit rate of the fourth PCM hierarchy level of 139.264 Mbit/s, said super frame being composed so that when it is transmitted in both incoming and outgoing directions two frames will each contain a complete picture line and each frame comprises 8704 bit including 8 bits for said two ISDN narrow-band channels B1 and B2 and data and wherein synchronization bits are contained for the frame synchronization or, respectively, segment synchronization (Vor);
   c. the frame of data transmitted in said outgoing direction is shifted by 80% of the frame duration to the frame of data transmitted in said incoming direction and contains a pre-span interval between the signals from various sources which arrive at said receiver of the network terminating unit (NT) with different phase relations, said pre-span interval being synchronization bit pattern;
   d. for the purpose of unambiguously recognizing overlaying pulses from different sources which are active at the same time, D-channel signalling bit transmitted at the frame start from said terminal equipment (TE) to said network terminating unit (NT) is expanded by at least 10 times and is coded in pseudoternary fashion.

2. System according to claim 1 characterized in that a timespan of 36 CMI bits is provided at the beginning of each of the two frames of the super-frame or the D-channel signalling bit (D) output in said outgoing direction (TE→NT), said time span being provided such that respectively 2 bits which have the sequence $+1-1$ or 00 are transmitted dc-free for every expanded signalling bit, whereas all other bits of the frame remain CMI coded.

3. System according to claims 1 or 2, characterized in that both the transmitted information of the narrow-band channel as well as those of the broadband channel in said outgoing direction (toward NT) are introduced by a free-span (Vor) composed of 7 bits for the clock phase matching and of 1 bit for synchronization of data.

4. System according to claims 1 or 2, characterized in that the picture line of the broadband channel comprising 8640 bits in said outgoing direction toward the network terminating unit is preceded by 2 bits for video synchronization (b-Sync).

5. System according to claim 1, characterized in that the first frame of the super-frame in arriving direction (NT TE) is preceded by a 16 bit frame synchronization word and the second frame is preceded by a 16 bit answerback word which is respectively followed by an activation/deactivation bit (A), which is followed by a D-channel echo bit (E) and by a D-channel signalling bit (D) which is followed by 25 arbitrarily employable CMI bits (X) for the compensation of the free-span (Vbr) for the opposite direction.

6. System according to claim 5, characterized in that the picture lines in said incoming direction are preceded by 10 bits for picture synchronization (B-sync)

7. System according to claim 1, characterized in that the individual signal sections of the frames in said outgoing and said incoming directions are each terminated with a protection zone bit (G/S) which can also be employed for dc compensation.

* * * * *